Aug. 27, 1940.　　　　L. H. CAMPOS　　　　2,213,064
KNIFE
Filed Dec. 9, 1938
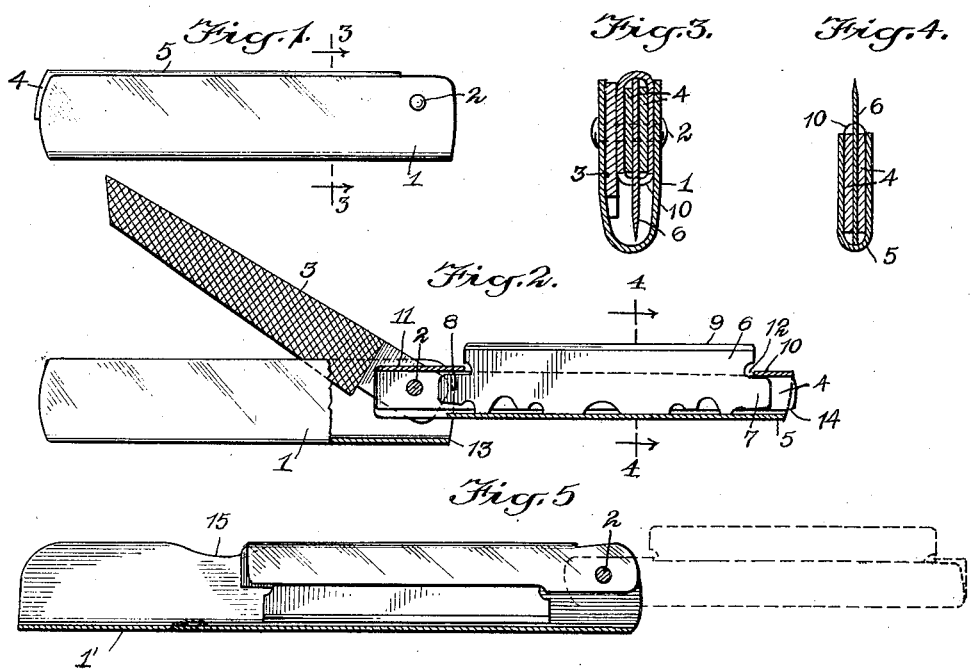
WITNESSES
INVENTOR
Louis H. Campos
BY
Munn, Anderson & Liddy
ATTORNEYS Patented Aug. 27, 1940

2,213,064

UNITED STATES PATENT OFFICE 2,213,064

KNIFE

Louis H. Campos, New York, N. Y.

Application December 9, 1938, Serial No. 244,722

2 Claims. (Cl. 30—331)

This invention relates to knives and has for an object to provide an improved construction wherein the cutting member may be swung readily from an operative to an inoperative position when applying or removing the cutting member.

Another object of the invention is to provide a knife structure having a U-shaped body and a U-shaped blade-holding member swingable into and out of the body.

In the accompanying drawing—

Fig. 1 is a side view of a device embodying the invention when the same is arranged as a knife;

Fig. 2 is a view with the casing in longitudinal section and one of the blades shown open;

Fig. 3 is a transverse sectional view through Fig. 1 approximately on the line 3—3, the same being on an enlarged scale;

Fig. 4 is a tranverse sectional view through Fig. 2 approximately on the line 4—4, the same being on an enlarged scale;

Fig. 5 is a view similar to Fig. 2 but showing a complete longitudinal section and illustrating a slightly modified construction to that shown in Figs. 1 and 2.

Referring to the accompanying drawing by numerals, 1 indicates a handle U-shaped in cross section which may be made from steel or other metal, or, in fact, from other suitable material. A pivot pin 2 extends through the handle 1 near one end, and on this pin there is pivotally mounted a file 3, a blade-holder 4, and a body or casing 5. A blade 6 is positioned in the holder 4 ready for use. This blade may be a specially prepared blade or may be an ordinary safety razor blade. In Fig. 2, however, one half of a well known safety razor blade is shown as it provides the desired extensions or projections 7 and 8, as well as the cutting edge 9. The holder 4 is U-shaped at the outer end 10 and also at the inner end 11 to provide shoulders or abutments against which the extensions 7 and 8 press. Between the inner and outer ends there is provided a slot 12, through which the blade extends. The bottom of the holder 4, as shown in Fig. 2, is open for the full length so that when the blade 4 is applied it is placed in position from the bottom and forced outwardly until the extensions 7 and 8 strike the closed ends or shoulders 10 and 11. The closed end or shoulder 10 is then forced downwardly so that the holder will telescope into the casing 5 to the position shown in Figs. 2 and 4. The device is then ready for use.

In case the device is to be used for cutting purposes, the casing 5 and associated parts are swung downwardly until the bottom of the casing strikes the corner or edge 13 of the handle 1. When it is desired to remove the blade 9, the protruding corner 14 of holder 4 is pressed with the thumb nail in an upward direction, as shown in Fig. 2, and after the parts have been swung away from the casing 5, the blade 9 may be pulled downwardly through slot 12 and a new blade provided if desired. When the blade is not in use, the casing 5 and all parts associated therewith are swung over to the position shown in Fig. 1. It will be observed that the holder 4 is sufficiently long so as to project a short distance beyond the handle 1, whereby the thumb or finger nail may engage the end thereof and swing the parts to an open position. When the parts are closed, as shown in Fig. 1, the nail file and the cutting blade are both in the handle 1, so that the device may be carried in the pocket in the usual way of carrying pocket knives.

From the above description it will be seen that the inventive concept includes the production of a device which may be used as a ripping implement for tailors and the like, and as a knife for general use.

I claim:

1. A device of the character described comprising a handle substantially U-shaped in cross section at all points for its full length, a pivot pin extending through said handle near one end, a casing substantially U-shaped in cross section at all points for its full length journaled at one end on said pivot pin and a holder for a blade having end extensions, said holder having one end journaled on said pivot pin, said blade holder being open at the back and also at the front except for a pair of end sections, whereby a blade having end extensions may be inserted through the back of said blade holder with the end extensions held in place by the end sections of the holder while the cutting edge of the blade extends beyond the holder, said holder swinging bodily into said casing and said casing and holder swinging bodily into said handle.

2. A device of the character described including a blade having a single edge and an extension at each end, a holder for said blade, said holder being provided with a pair of parallel members and a connecting bar at each end for connecting said parallel members together along one edge whereby the holder will be open at the front and back except for a short distance adjacent each end for coacting with said extensions limiting the movement of said blade in one direction through the holder, a casing substantially U-shaped in cross section, a pin for pivoting said holder at one end in said casing at one end of the casing so that when the device is in use the inner edge of the blade will be pressing against the inner surface of the back of the casing, and a handle substantially U-shaped in cross section, said casing having one end projecting into one end of said handle, said pin acting to swingably connect the handle with said casing so that the casing and holder with said blade may be swung to a position within said handle, said handle, casing and holder all swinging on said pin.

LOUIS H. CAMPOS.